(12) United States Patent
Lebovici

(10) Patent No.: US 11,058,925 B1
(45) Date of Patent: Jul. 13, 2021

(54) GOLF BALL RETRIEVER

(71) Applicant: Victor B Lebovici, West Newton, MA (US)

(72) Inventor: Victor B Lebovici, West Newton, MA (US)

(*) Notice: Subject to any disclaimer, the term of this patent is extended or adjusted under 35 U.S.C. 154(b) by 0 days.

(21) Appl. No.: 16/752,709

(22) Filed: Jan. 27, 2020

Related U.S. Application Data

(60) Provisional application No. 62/956,667, filed on Jan. 3, 2020, provisional application No. 62/813,305, filed on Mar. 4, 2019.

(51) Int. Cl.
| | | |
|---|---|---|
| *A63B 47/02* | (2006.01) | |
| *A63B 102/32* | (2015.01) | |
| *B25J 1/04* | (2006.01) | |

(52) U.S. Cl.
CPC .......... *A63B 47/02* (2013.01); *A63B 2102/32* (2015.10); *A63B 2225/093* (2013.01); *B25J 1/04* (2013.01)

(58) Field of Classification Search
CPC .............. A63B 47/02; A63B 2225/093; A63B 2102/32; B25J 1/04
See application file for complete search history.

(56) References Cited

U.S. PATENT DOCUMENTS

| | | | |
|---|---|---|---|
| 3,265,430 A | * | 8/1966 | Jenkins .................. A63B 47/02 294/19.2 |
| 3,770,308 A | | 11/1973 | Faber et al. |
| 3,887,225 A | | 6/1975 | McKee |
| 3,922,027 A | * | 11/1975 | Nesselt ...................... B25J 1/04 294/19.2 |
| 4,180,288 A | | 12/1979 | Sievers |
| D266,264 S | | 9/1982 | West |
| 4,493,503 A | | 1/1985 | Jeninga |
| D283,432 S | | 4/1986 | Rosenow |
| 4,728,134 A | | 3/1988 | Allen |
| D306,058 S | | 2/1990 | Blake |
| 5,188,409 A | | 2/1993 | Forey |
| 5,265,926 A | | 11/1993 | DiNardo |
| 5,326,145 A | | 4/1994 | Lee |
| D349,739 S | | 8/1994 | Kahl |
| 5,368,352 A | | 11/1994 | Juhas |

(Continued)

OTHER PUBLICATIONS

Igotcha Golf Ball Retriever, Admitted prior art.

(Continued)

*Primary Examiner* — Stephen L Blau

(57) ABSTRACT

A golf ball retriever includes a body member having a ball receiving opening at one end that opens to a ball receiving cavity within the body member. Opposed bosses extend from the body member and include boss openings external to the ball receiving cavity. A retention member extends across the ball receiving cavity and has opposed ends secured within the boss openings. The body member may include at least one flange having a pivot opening and the pole-mounting member includes a pivot hole opening. A pivot member extends through the respective pivot openings of the body member and pole-mounting member to provide a hinge for pivotal rotation of the pole-mounting member with respect to the body member. A telescoping pole is coupled to the body member. A no-rotation telescoping pole including a plurality of non-circular shaft sections is optionally employed.

17 Claims, 7 Drawing Sheets

(56) References Cited

U.S. PATENT DOCUMENTS

| | | | |
|---|---|---|---|
| D361,354 S | 8/1995 | Bailey et al. | |
| 5,632,692 A | 5/1997 | Lebovici | |
| D380,025 S | 6/1997 | Digerness et al. | |
| 5,651,571 A | 7/1997 | Diveto | |
| 5,823,591 A | 10/1998 | Rubinstein | |
| 5,829,806 A | 11/1998 | Sykes | |
| 6,077,170 A | 6/2000 | Hawkins | |
| 6,120,387 A | 9/2000 | Bobst | |
| 6,257,635 B1 | 7/2001 | Toreli | |
| 6,257,990 B1 | 7/2001 | Kariatsumari | |
| D457,932 S | 5/2002 | Bellville | |
| 6,454,331 B1 | 9/2002 | Ahlenius | |
| 6,962,536 B2 * | 11/2005 | Hall | A24F 13/12 131/241 |
| 7,874,932 B2 * | 1/2011 | Chol | A63B 53/14 473/296 |
| 9,475,183 B2 * | 10/2016 | Light | A63B 47/02 |
| 2002/0169030 A1 | 11/2002 | Chun-Sheng | |
| 2004/0100109 A1 * | 5/2004 | Johnson | A47F 13/06 294/26 |
| 2006/0138791 A1 * | 6/2006 | Lebovici | A63B 47/02 294/19.2 |

OTHER PUBLICATIONS

Search 'N Rescue Hinge Cup Golf Ball Retriever, Date unknown.

Photograph of no-rotation telescopic shaft available from Shenzhen Sinpure Technology Co., Ltd, 403 Building C, SiJiXinCheng, ZhenMing Rd 161, GongMing St, GuangMing, Shenzhen City, Guangdong Province, China 518106; Admitted prior art.

Screenshot of website pertaining to Non-Rotating Telescopic Aluminum Tubing available from Testrite Instrument Co., 216 S Newman Street, Hackensack, NJ 07601; Admitted prior art.

\* cited by examiner

GOLF BALL RETRIEVER

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention pertains to an accessory employed in connection with the game of golf and, more specifically, to a golf ball retriever for retrieval of golf balls from water hazards, bushes, and other areas generally inaccessible to a user.

A large number of golf ball retrievers are known in the art. Many of the golf ball retrievers known in the art are relatively complex and employ moving parts for ball capture or components that are fragile, prone to breakage or make ball capture more difficult in certain situations.

One golf ball retriever known in the art is disclosed in US published application 2006/0138791 (the '791 application) naming the same inventor as the presently disclosed invention. The '791 application employed a retention member disposed within the body of a ball retriever head. The retention member, as therein disclosed, is positioned as a chordal segment and serves as the capture mechanism for retaining a ball within the body once a ball had been urged past the retention member and into the cavity of the retriever head. Due to the nature of the retainer, it is likely that the retainer would need to be replaced from time to time. The retainer therein disclosed is a uniquely configured component which would need to be specially fabricated. Accordingly, costs associated with the fabrication of this unique component would be required and costs incurred in the support of users of the ball retriever therein disclosed in the event of the failure or breakage of the retainer.

It would therefore be desirable to have a golf ball retriever that did not involve the complexity of moving parts for ball capture, was durable, could be manufactured in high volume at low cost, was simple to use and effective for capturing golf balls that had gone astray.

BRIEF SUMMARY OF THE INVENTION

A golf ball retriever head includes a body member having a ball receiving cavity. The body member is configured to receive a golf ball through a generally circular opening provided at one end thereof. The body member includes a pair of opposed external bosses extending vertically and external of the ball receiving cavity. In one embodiment, the opposed bosses provide boss openings in the form of bores or channels therethrough that are aligned on a common longitudinal axis and configured to receive a resilient retention member such as a beam-like member or spring. In another embodiment, the inner surfaces of the bosses at least partially define opposed boss openings in the form of open areas located generally externally of the ball receiving cavity of the body member. The boss openings provide an area for securing ends of the retention member. Additionally the boss openings are generally at least partially external of the outer surface of the generally dome shaped body member that would be provided but for the bosses; i.e. if the half of the dome-shaped body member that is devoid of bosses, were mirrored. Ends of the retention member are removably secured within the boss openings to permit replacement of the retention member should such become necessary. A portion of the retention member extends through the cavity along a segment, such as a generally chordal segment of the ball receiving cavity of the body member. Alternatively, a beam-like member may have a slight inward curvature toward a vertical axis through the center of the ball receiving cavity. The retention member may be secured against lateral movement via an interference fit within one of both channels through the bosses, via angling of the channels through the bosses with respect to the segment through the cavity, or via the use of at least one fastener that intersects at least a portion of the retention member. More specifically, a fastener, such as a screw, may be employed to secure ends of a beam-like retention member or a spring employed as the retention member within the boss openings. In one embodiment, fingers formed within the bosses may be provided for securing opposed ends of the retention member. A retention member, such as a spring having loops at the end thereof, may be mounted within the body member with loop or hook ends being retained by the fingers.

An inward facing edge of the retention member that is facing the distal inner wall surface of the body member is spaced from the distal inner wall surface by a distance that is slightly less than the diameter of a golf ball. The retention member is resilient or deformable to permit the ball to enter the ball receiving cavity when the ball is urged past the retention member, However, the retention member is sufficiently stiff to prevent the weight of the ball or normal movement of the retriever head to cause the ball to undesirably fall out of the cavity during ball retrieval. The retention member is removable for replacement should replacement of the retention member be necessary due to breakage or wear over time.

In one embodiment, a plurality of parallel, spaced flanges extend upward from the generally dome-shaped body member and have opposed coaxially aligned pivot holes or openings. The flanges are configured and spaced to accommodate the mounting therebetween of a pole-mounting member having a bore that is sized to receive a telescoping pole. The pole-mounting member is pivotally mountable between the opposing outwardly extending flanges using a rivet, screw or any other suitable fastener to provide for pivotal rotation of the body member with respect to the telescoping pole when the telescoping pole is mounted within the pole-mounting member. In another embodiment, the body member includes three (3) or more generally parallel spaced flanges upwardly extending from the body member and the pole-mounting member includes two (2) or more generally parallel spaced flanges extending from one end thereof. The flanges of the body member and the pole-mounting member each have coaxially aligned pivot holes extending therethrough. The flanges of the pole-mounting member are interleaved with the flanges extending from the body member with their respective pivot holes and pivot openings coaxially aligned. A fastener extends through the pivot holes to form a hinge that permits pivotal rotation of the body member with respect to the telescoping pole. In another embodiment, the body member includes a single upwardly extending flange and the pole-mounting member includes a pair of spaced flanges extending from one end thereof and in yet another embodiment, the body member includes a pair of spaced flanges extending upwardly from the body member and the pole-mounting member includes a single flange extending from one end thereof. Pivot holes are provided in the pole-mounting member flanges and pivot holes are provided in the body member flanges for pivotal mounting of the pole-mounting member to the body member to provide a hinge between the body member and the pole-mounting member.

To permit the user to secure the body member at a particular angle with respect to the telescoping pole for ball retrieval, to effectively retain or lock the body member at a desired angle with respect to the telescoping pole and to adjust the force needed to rotate the body member with respect to the telescoping pole, a fastener mechanism, such as a bolt that extends through the coaxially aligned holes of the body member flanges and the pole-mounting member and a cooperative nut, may be provided. Knobs or other user rotatable structures may be secured to the opposing ends of the fastener mechanism to permit the compressive force applied by the fastener mechanism to be increased or decreased. The bolt and cooperative nut may be tightened or loosened or the knobs may be rotated with respect to one another manually to allow a user to variably squeeze the flanges against one another to alter the inter-flange friction and therefore, the force needed to rotate the body member with respect to the pole-mounting member.

The telescoping pole typically includes a plurality of sections having different diameters. Sections of the pole may include a twist-lock mechanism, such as internal cam members as known in the art, or alternatively external clamping members as known in the art to secure the pole in an extended or retracted configuration once the user has set the pole at the desired length. Alternatively, the telescoping pole may have a plurality of sections of different diameters in which the outer and inner diameters of adjacent section are specified to provide longitudinal sliding friction to maintain the length of the pole once slidably adjusted by a user. Alternatively, spacing or spring-like friction members may be disposed between the outside diameter of each section and the inside diameter of each adjacent larger diameter section to provide longitudinal sliding friction to maintain the length of the pole once extended or retracted by a user. The telescoping pole sections may be non-circular to prevent rotation of the adjacent sections with respect to one another.

BRIEF DESCRIPTION OF THE SEVERAL VIEWS OF THE DRAWINGS

Various aspects of the present invention are discussed below with reference to the accompanying figures. For simplicity and clarity of illustration, elements shown in the drawings have not necessarily been drawn to scale in all cases. For example, the dimensions of some of the elements may be exaggerated relative to other elements for clarity. Additionally, several physical components may be included as one functional element recognizing, that in practice, they may be provided as two or more elements. Further, where considered appropriate, reference numerals may be repeated among the drawings to indicate corresponding or analogous elements. For purposes of clarity, not every component may be labeled in every drawing. With the aforementioned in mind, the invention will be more fully understood by reference to the Detailed Description of the Invention in conjunction with the following drawings of which:

FIGS. 14*a*-14*g* illustrate exemplary cross-sections of tubing for non-circular telescoping shafts for use with a golf ball retriever that prevent rotation of adjacent telescoping shaft sections.

DETAILED DESCRIPTION OF THE INVENTION

Figure 1:
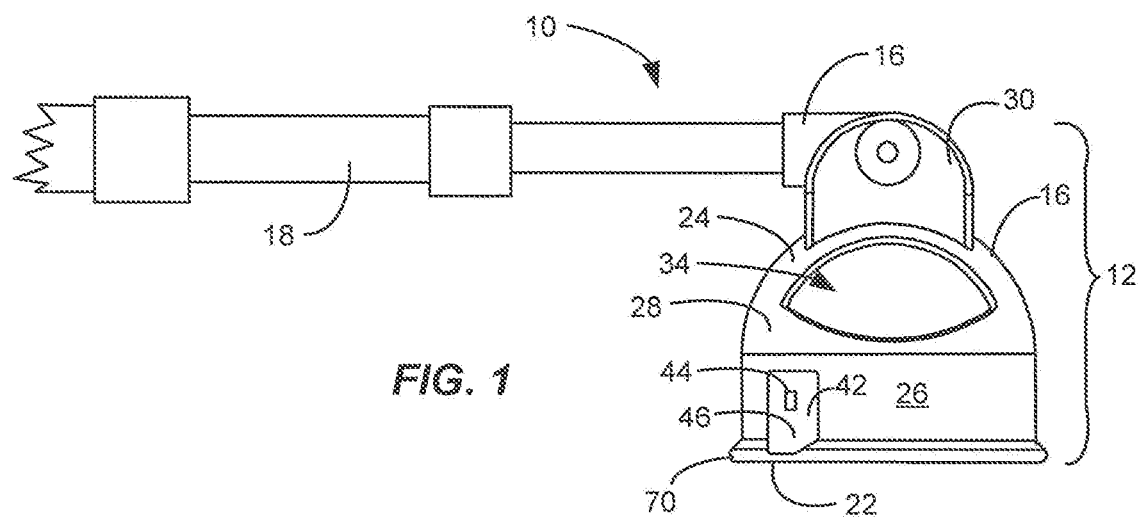
FIG. 1 is a partial side elevation view of a golf ball retriever in accordance with the present invention including a body member and a pole-mounting member that collectively form a golf ball retriever head and a telescoping shaft mounted to the pole-mounting member of the golf ball retriever head.

The present application claims priority of U.S. provisional application 62/813,305 filed Mar. 4, 2019 and U.S. provisional application 62/656,667 filed Jan. 3, 2020 both of which are incorporated herein by reference in their entirety.

In the following description, numerous specific details are set forth in order to provide a thorough understanding of the embodiments of the present invention. It will be understood by those of ordinary skill in the art that the present invention may be practiced without some of these specific details. In other instances, well-known methods, procedures, components and structures may not have been described in detail so as not to obscure the embodiments of the present invention.

It is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

It is appreciated that certain features of the invention, which are, for clarity, described in the context of separate embodiments, may also be provided in combination in a single embodiment and such is contemplated herein. Additionally, specific features and structures described in conjunction with one embodiment and providing a specific function may be employed in other embodiments provided such a configuration is consistent with the provision of the specific function in the other embodiments. Conversely, various features of the invention, which are, for brevity, described in the context of a single embodiment, may also be provided separately or in any suitable sub-combination.

In accordance with the present invention, an improved golf ball retriever 10 is disclosed. Referring to FIGS. 1-8, the retriever 10 includes a retriever head 12 that includes a body member 14, a pole-mounting member 16, and a telescoping pole or handle 18 that is securable within the pole-mounting member 16. The pole-mounting member 16 is pivotally mountable to the body member 14 as subsequently described in greater detail.

Figure 2:
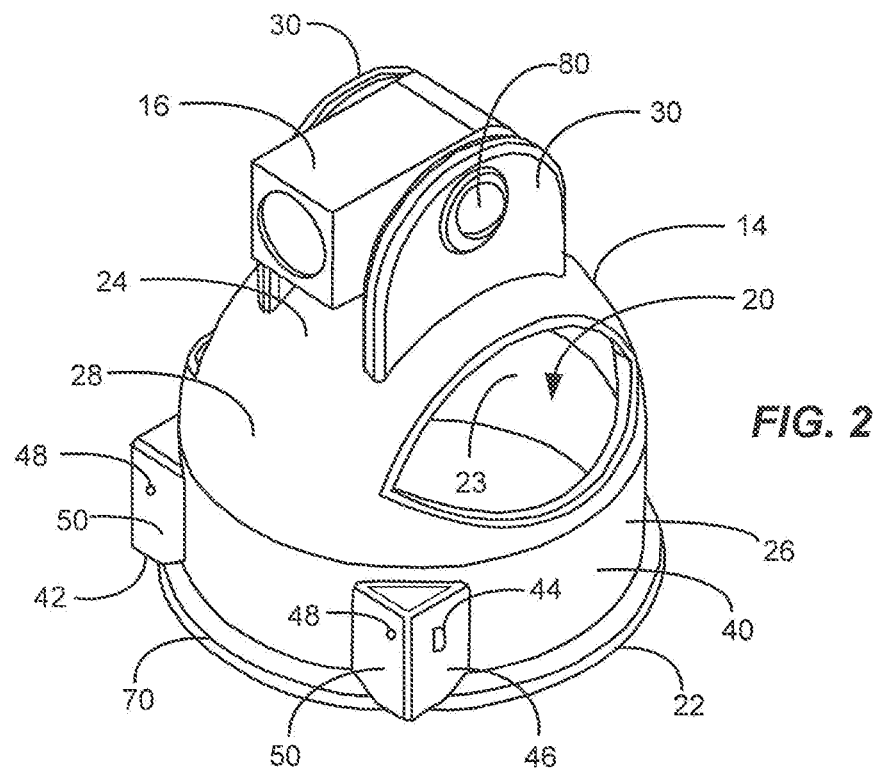
FIG. 2 is a top right perspective view of the golf ball retriever head of FIG. 1.

The body member 14 defines a cavity 20 having a first open end 22 sized and configured to receive a golf ball therethrough. In the exemplary illustrated embodiment, the body member 14 has an inner surface 23 partially defining the ball receiving cavity 20. The inner surface 23 of the ball receiving cavity 20 generally occludes the cavity 20 at a second end 24 of the body member 14. The body member 14 may have a generally cylindrical lower body portion 26 extending partially around the circumference of the body member as illustrated and a generally dome shaped upper body portion 28 although it should be recognized that the body member 14 may be provided in any geometric shape that provides the same functions as herein illustrated and described. As illustrated in FIG. 2, parallel opposed flanges 30 extend outward from the second end 24 of the body member 14 and are cooperative with a pole-mounting portion 16 to permit pivotal rotation of the pole-mounting portion 16 with respect to the body member 14 about a pivot axis as subsequently described. The flanges 30 include coaxially aligned pivot openings or holes 32. The upper body portion 28 of the body member 14 defines openings 34 sized and configured to permit a user to insert a finger therethrough to urge a ball out of the cavity 20.

The body member 14 includes an outer sidewall that corresponds to the outer surface 40 of the generally cylindrical lower body portion 26 of the body member 14. In the exemplary illustrated embodiment, bosses 42 extend outward from the outer surface 40 of the otherwise generally cylindrical lower body portion 26 and are configured to provide boss openings or mounting areas within each boss 42 that are external of the ball receiving cavity 20 and the outer surface 40 for securing respective ends of a retention member 52 therein. The bosses 42 have side faces 46 and front faces 50. In the illustrated embodiment the ball receiving cavity 20 is defined by the inner surface of the dome shaped portion 28 of the body member 14 and a cylinder having a circumference corresponding to that of the inner surface of lower body portion 26 and excludes the areas encompassed by the outwardly extending bosses 42. In the illustrated embodiment, the bosses 42 are provided as mirrored structures around a plane P1 that is parallel to and midway between the pair of opposed flanges 30 (see FIG. 4) and, as noted, extend outward from the otherwise generally cylindrical lower body portion 26.

By providing the boss 42 openings or mounting areas external of the ball receiving cavity, the diameter of the body member 14 can be maintained as a size only slightly larger than a golf ball which at the same time providing a mounting facility for the retention member that allows for relative ease of installation and replacement of the retention member 52 should replacement become necessary. Minimizing the overall size of the body member 14 is desirable so as to reduce the amount of space the golf ball retriever head occupies in a golf bag.

The body member 14 including the lower body portion 26, the upper body portion 28 and the body member flanges 30 may be formed as a continuous, single piece, integral unitary molded or cast member out of any suitable material.

Ends of the retention member 52 are removably secured or mounted within the openings or mounting areas provided by the bosses 42. In one embodiment, the bosses 42 include opposed longitudinally aligned openings or channels 44 that extend through the bosses 42 from the side faces 46. A hole 48 may optionally be provided in one or both front faces 50 of the bosses 42 for a fastener that serves to secure an end of the retention member 52 within the respective boss 42 as subsequently discussed. While the bosses 42 depicted in the illustrated embodiment have a generally triangular cross-section in a plane parallel to a plane defined by the first end 22 of the body member 14 (recognizing that one leg of the "generally triangular cross-section may be slightly curved to correspond to an outer circumference of the lower body portion 26 of the body member 14) the bosses 42 may have any suitable geometric shape that accommodates ends of the retention member 52 within openings or channels 44 provided by the bosses 42. More specifically, the bosses 42 define respective boss openings or mounting areas for securing ends of a retention member 52 therein.

Figure 3:
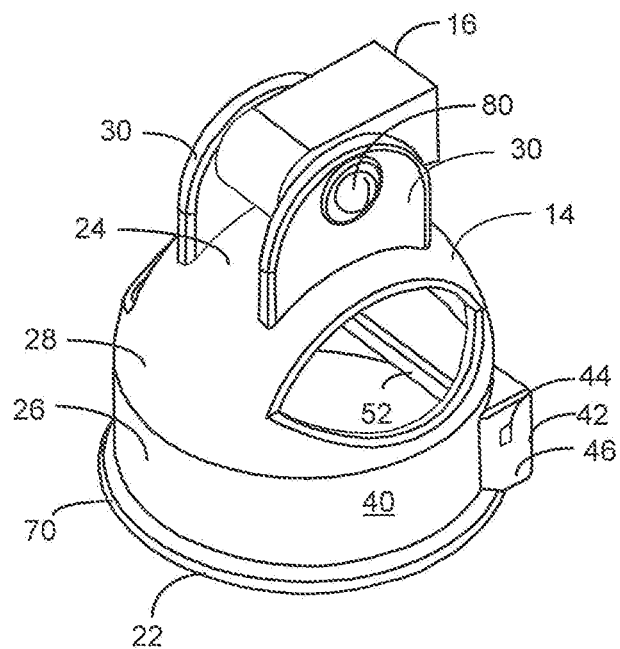
FIG. 3 is a rear left perspective view of the golf ball retriever head of FIG. 2 further illustrating a retention member disposed within the body member.
Figure 4:
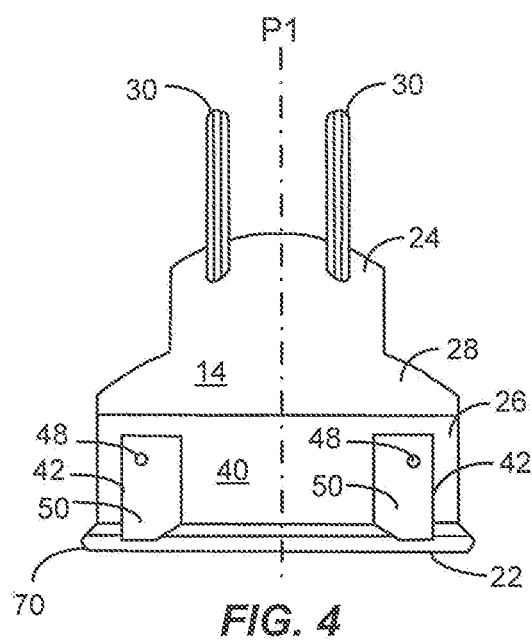
FIG. 4 is a front elevation view of the body member of FIG. 1.
Figure 5:
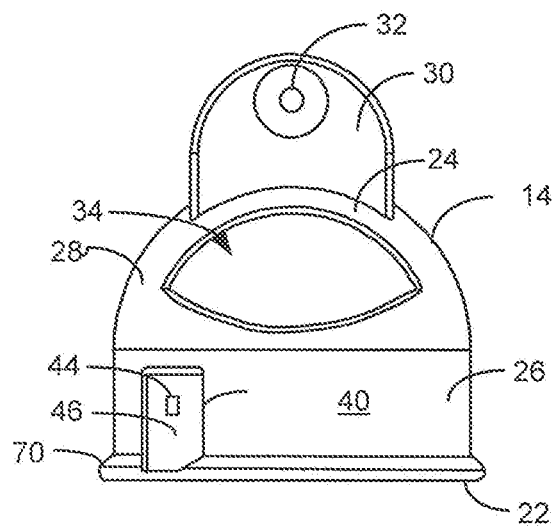
FIG. 5 is a right side elevation view of the body member of FIG. 1.
Figure 6:
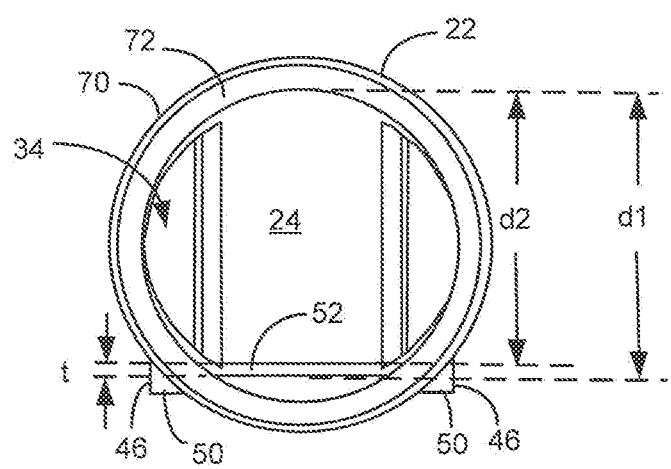
FIG. 6 is a bottom plan view of the body member of FIG. 1.
Figure 7:
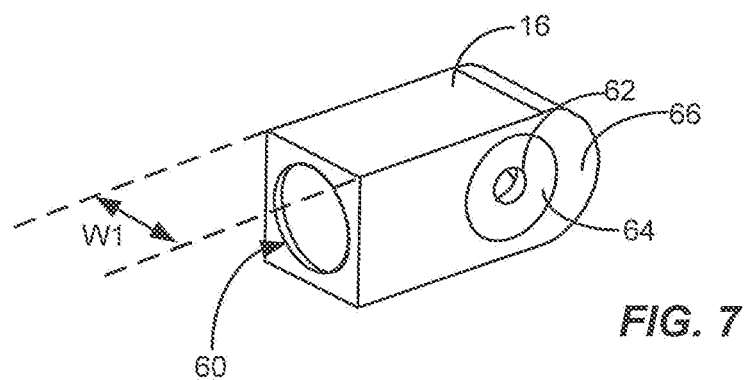
FIG. 7 is a perspective view of the pole surround member of FIG. 1.
Figure 8A:
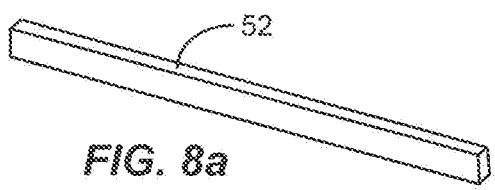
FIGS. 8*a* and 8*b* are perspective views of retention members for use in accordance with the present invention.
Figure 8B:

The retention member 52 extends across a segment of the cavity (such as a generally chordal segment as shown in the illustrated embodiment) with opposing ends of the retention member 52 extending at least partially through the channels 44 of the respective bosses 42 as illustrated in FIGS. 3 and 6. The retention member 52 may be a beam-like member having a generally rectangular cross section, a circular cross section, an oval cross section, a generally rectangular-cross section with rounded corners or any other suitable cross-section that provides the functions herein described. Alternatively, retention member 52 may be a curved beam-like member that is curved inward toward a vertical axis through the center of the body member 14. At least one end of the retention member 52 is secured in one of the bosses 42 to prevent longitudinal movement of the retention member 52 and possible dislodgement during use although both ends of the retention member 52 may be secured in the boss openings or mounting areas that are at least partially defined by the respective bosses 42. The ends of the retention member 52 may be secured within the boss openings of the respective bosses 42 by providing an interference fit between the retention member 52 and the surfaces of one or both channels 44 of the bosses. Alternatively, the ends of the retention member may be secured within the openings or mounting areas provided by the bosses 42 via use of a fastener, such as a screw, that secures the respective end of the retention member 52 within the respective boss 42. Additionally, ends of the retention member may be secured within the boss 42 openings or mounting areas via use of an adhesive, or via any other suitable technique. Furthermore, channels 44 may be angled with respect to the plane P1 rather than being perpendicular thereto to provide mechanical resistance to lateral movement of a beam-like retention member 52 once the retention member 52 has been mounted in its intended use position with ends disposed in the channels. A beam-like retention member 52 may extend from the outside edge of one boss 42 across the cavity 20 to the outside edge of the opposing boss 42. The retention member 52 may be formed of a resilient material such as nylon, DELRIN™, nylon or any other suitable synthetic or other resilient resin, metal or other suitable material. It has been determined empirically that a plastic retention member 52 fabricated of nylon 66 material and having a cross-section of between 1.05-1.20 mm in width and 2.4-2.6 mm in height provides sufficient resilience to provide ease of ball entry into the body member 14 cavity 20 and sufficient stiffness to retain the ball within the cavity 20 until removed by a user although it should be recognized that any retention member fabricated of any suitable material including synthetic and other resins or metals, and having dimensions and resiliency characteristics that provide the above-described functions, may be employed.

The retention member 52 may also comprise a compression spring or a tension spring having appropriate resilience and stiffness characteristics to support the weight of a golf ball once disposed within the ball receiving cavity 20. Such springs may have their ends secured, for example, within the boss openings or mounting areas of the bosses 42 via a screw or other suitable fastener, or cooperatively with a structure provided within the boss 42 opening, for example, as subsequently described. Fasteners may be employed to secure the spring ends when the spring ends are disposed within the boss openings 44 to secure the retention member 52 in its use position. For example, screws may be provided that extend through loop or hook ends of a spring used as a retention member to secure the opposed spring ends within the boss 42 openings.

The diameter of a golf ball is generally not less than 42.5 mm and is depicted in FIG. 6 as distance "d1." In the illustrated embodiment, once the ends of the retention member 52 are secured in the boss openings, the distance from the inside edge of the retention member 52 to the distal inner surface of the lower body portion 26 "d2" is slightly less than the distance "d1". When the retention member 52 is a spring, the wire diameter, spring outside diameter, length and spring rate are selected to achieve desired ball capture and retention characteristics. The actual distance d2 is dependent upon the transverse flexibility or stiffness of the retention member 52. The distance d2 is dependent upon the thickness "t" of the retention member 52, its height, its cross-section and the material from which it is fabricated with a beam-like retention member. By way of example, depending on the flexibility of the retention member 52, the position of the inner edge of the retention member 52 with respect to the opposing inner wall surface of the lower body portion 26 may be between 1 and 2 mm less than the diameter of the golf ball. In other embodiments, the distance from the inner edge of the retention member 52 to the opposing inner wall surface of the lower body portion 26 may be 1-3 mm, 1-4 mm or 1-5 mm less than the diameter of the golf ball.

The retention member 52 is specified to have a resilience that permits a golf ball to slightly deform the retention member 52 to permit the ball to easily enter the cavity 20 as the body member 14 is urged over the ball and to have sufficient stiffness to support the ball within the cavity 20 once the ball has been urged therein, i.e. the weight of the ball and normal movement of the retriever head 12 will not normally cause the ball to fall out of or be dislodged from the cavity 20 prior to removal by a user.

A bore 60 extends longitudinally into the pole-mounting member 16 from one end thereof. The bore 60 has a diameter sized to receive an end of the telescoping pole 18. The pole-mounting member 16 also includes coaxially aligned pivot holes 62 extending through the sides thereof. Additionally, each side of the pole-mounting member 16 optionally includes a generally circular recess or counter-bore 64 that is coaxially aligned with the pivot holes 62 and sized to receive a washer (not shown). In the illustrated embodiment, the washers extend slightly outward of the side edges 66 of the pole-mounting member when positioned within the recess 64; for example, approximately one-half the thickness of the washers may extend outward a distance "w2" (not shown) beyond the sides 66 of the pole-mounting member. The spacing between the inner edges of opposed flanges generally corresponds to the width of the pole-mounting member 16 "w1" (see FIG. 7) plus two times the distance "w2." Alternatively, if no washers are employed, the width of the pole-mounting member 16 generally corresponds to the distance between the opposed flanges 30.

The pole-mounting member 16 is disposed between the opposed flanges 30 with the pivot holes 62 of the pole-mounting member 16 coaxially aligned with the pivot holes or openings 32 through the flanges 30. A fastener 80, such as a machine screw, a rivet or any other suitable fastener, is disposed through the coaxially aligned pivot holes or openings 32, 62 and pivot holes provided near the end of the telescoping pole (not shown) to secure the telescoping pole 18 within the pole-mounting member 16 and to secure the pole-mounting member 16 to the body member 14 while permitting pivotal rotation of the telescoping pole 18 and the pole-mounting member 16 with respect to the body member 14. In this manner, the body member 14 may be rotatably positioned with respect to the telescoping pole 18 to position the body member 14 at an angle that is appropriate for ball retrieval in any given situation. The fastener 80 compresses the flanges inward to create frictional engagement between the inner side surfaces of the flanges 30 and the confronting washers disposed within recesses 64 of the pole-mounting member 16 or the sides of the pole-mounting member 16 if no washers are employed. By reason of the frictional engagement of the flanges 30 with the washers or pole-mounting member 16 sides if no washers are employed, in typical use, the body member 14 will maintain its pivotal relationship with respect to the pole-mounting member 16 unless repositioned by a user. Alternatively, as discussed in greater detail with respect to FIG. 13, knobs 124 may be provided to facilitate user adjustment of the inward directed force on the flanges to vary the force needed to rotate the pole-mounting member 16 with respect to the body member 14.

While the illustrated embodiment includes the pole-mounting member 16 to pivotally secure the telescoping pole 18 to the body member 14, the telescoping pole 18 may be pivotally mounted to the body member 14 without the use of the pole-mounting member 16. More specifically, the telescoping pole 18 may be disposed directly between spaced side edges of the opposed flanges 30 of the body member 14 with the pivot holes that extend through the end of the telescoping pole 18 coaxially aligned with the pivot holes 32 of the flanges. Alternatively, a fitting (not shown) that includes a pivot hole may be secured at the end of the telescoping pole and the fitting may be pivotally mounted between the opposed spaced flanges 30. A fastener is provided that extends through the pivot hole of the telescoping pole 18 or fitting and the pivot holes 32 of the flanges 30 to pivotally mount the body member 14 to the telescoping pole 18.

The body member 14, the pole-mounting member 16, the retention member 52 and knobs, if employed, may each be formed as a continuous, single piece, integrally formed, molded or cast member out of any suitable material. More specifically, the components of the retriever head 12 may be formed via injection molding any suitable synthetic resins or other resins known in the art to achieve high quality, durable components at low cost or cast as metal components. By way of example and not limitation, the components may be molded from an ABS, a polycarbonate or any other suitable material. The body member 14, the pole-mounting member 16, the retention member 52 and knobs, if employed, may be fabricated of the same material or of different materials.

The body member 14 in the illustrated embodiment includes an angled lip 70 that extends from the first end 22 of the body member 14. The angled lip 70 has an inward facing surface 72 that serves to urge a golf ball that comes in contact with that surface toward the opening at the first end 22 of ball receiving cavity 20. This feature is particularly advantageous when using the retriever head as a scoop to retrieve a ball from a soft or silty surface.

Figure 9:
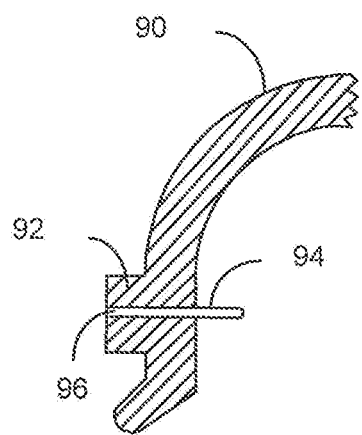
FIG. 9 is a partial cross-sectional schematic view of an alternative embodiment of a body member employing a radially oriented retention member retained in a boss that extends outward from the outer surface of the body member.

In an alternative embodiment illustrated in FIG. 9, a body member 90 includes a singular boss 92 that extends outward from a generally cylindrical body member surface. A retention member 94 is secured in a bore that extends through the boss 92 and the body member 90. The retention member 94 is fabricated of a resilient material and extends inward from an inner surface of the body member 90 a sufficient distance so as to engage a golf ball as the ball enters the ball receiving cavity. The retention member 94 may be press fit into the bore 96 to secure the retention member 94 within the bore 96 or have a threaded end that is cooperative with a threaded bore to secure the retention member 94 to the body member 90. Although depicted for simplicity as a radially and inwardly extending finger, the retention member may have various shapes. By way of example and not limitation, the retention member 94 may have a generally planar inner end portion that terminates in a straight or curved edge that is configured to engage a golf ball as it enters the ball receiving cavity. As discussed hereinabove, the retention member 94 is sufficiently flexible to permit the ball to readily enter the ball receiving cavity of the body member 90 yet possesses sufficient stiffness to prevent the weight of the golf ball or normal movement of the retriever head from causing a ball to dislodge from the ball receiving cavity prior to removal by a user.

Figure 10:
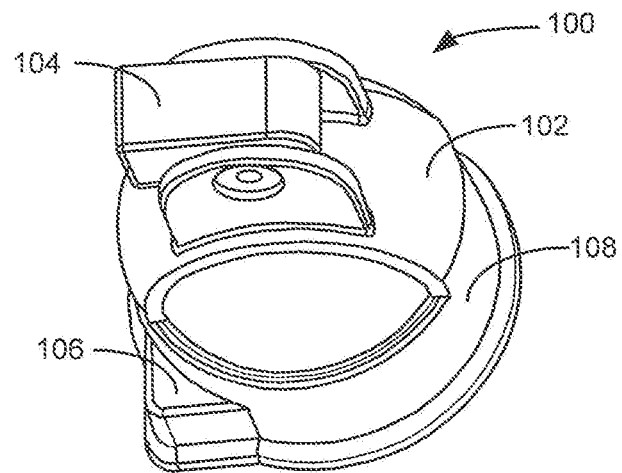
FIG. 10 is a perspective view of a golf ball retriever head in accordance with the present invention illustrating a pole-mounting member disposed between opposed flanges of a body member.

FIG. 10 illustrates another embodiment of a golf ball retriever head 100 in accordance with the present invention having a body member 102 and a pole-mounting member 104. The body member 102 includes bosses 106 that extend outward from the lower body member portion 108. The bosses 106 have interior walls that at least partially define boss openings that are external of the ball receiving cavity as previously discussed. Ends of a retention member (not shown) are secured within the boss openings via any suitable means. For example, referring to FIG. 11 which may have the external shape illustrated in FIG. 10, fingers 110 extend from a roof of the bosses 106 into the boss openings. The fingers 110 include inwardly extending recesses configured to receive loop or hook ends of a spring (not shown) for securing a tension spring employed as a retention member. The ends of the tension spring may be urged over the ends of the fingers 110 with the loop or hook ends disposed within the recesses to mount the spring within the body member 102.

Figure 11:
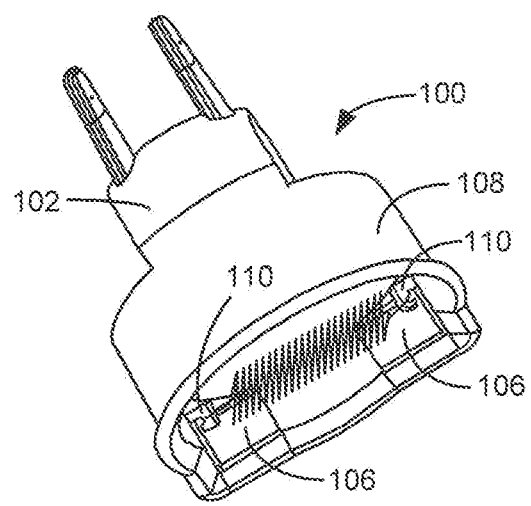
FIG. 11 is a perspective view of a golf ball retriever head in accordance with the present invention illustrating a pair of opposed downwardly extending fingers disposed within boss openings and configured for securing opposite ends of a retention member, such as a spring having loop ends, therebetween.
Figures 12, 13:
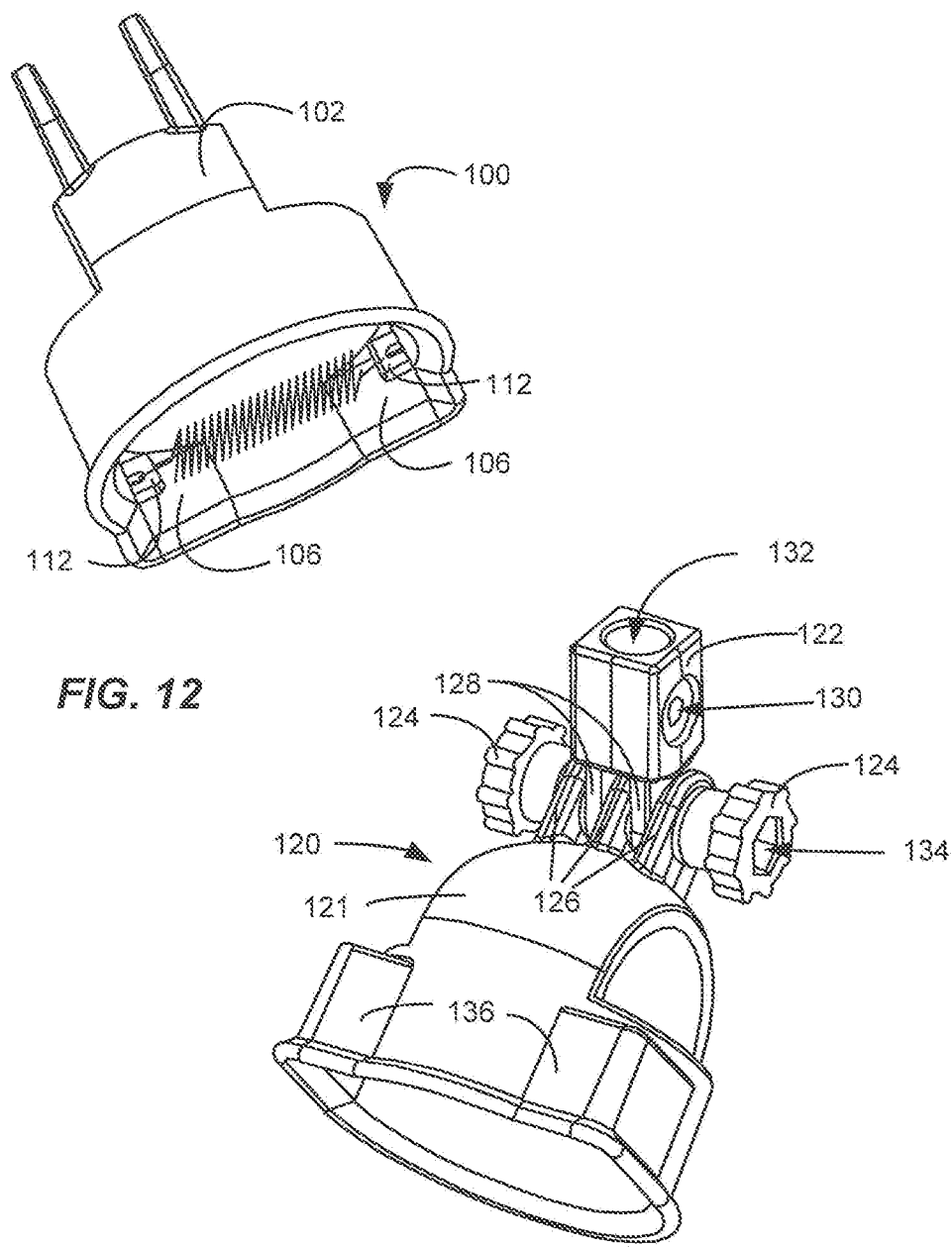
FIG. 12 is a perspective view of a golf ball retriever head in accordance with the present invention illustrating flanges downwardly extending within the boss openings, the flanges having holes therethrough configured for securing opposite ends of a retention member, such as a spring having hook ends, therebetween.
FIG. 13 is a perspective view of a golf ball retriever in accordance with the present invention illustrating a body member having three upwardly extending spaced flanges, a cooperative pole-mounting member having a pair of spaced flanges configured to permit pivotal rotation of the pole-mounting member with respect to the body member, and opposed knobs outboard of the flanges for adjusting rotational friction provided by the hinge.
Figure 14G:
Figure 14G:
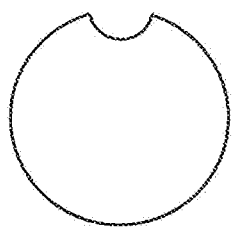
Figure 14G:
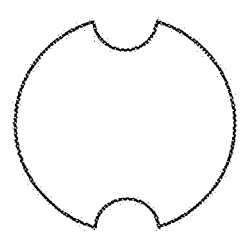
Figure 14G:
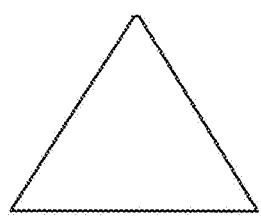
Figure 14G:
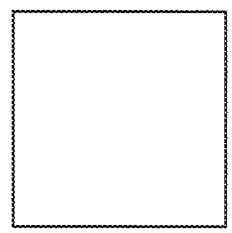
Figure 14G:
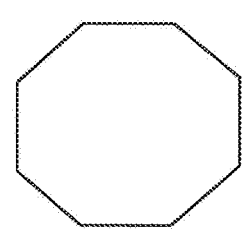
Figure 14G:
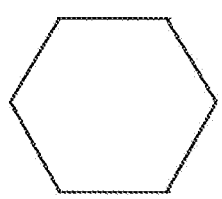

FIG. 12 depicts another embodiment that is similar to FIG. 11 and which may have the external shape illustrated in FIG. 10. However, instead of fingers 110 that include recesses configured to receive hook or loop spring ends, the body member 102 includes flanges 112 extending downward from the roof and sides of the bosses 106. An opening is provided through each flange 112 to permit a hook end of a spring, such as a tension spring, to be passed therethrough to secure the respective ends of the spring within the body member 102.

FIG. 13 depicts another embodiment of a golf ball retriever head 120 in accordance with the present invention. The illustrated golf ball retriever head 120 includes a generally dome shaped body member 121, a pole-mounting member 122 and knobs 124. The body member 121 also includes a plurality of spaced flanges 126 extending upwardly from the body member 121. The illustrated embodiment includes three spaced flanges 126 although any suitable number of flanges may be employed. The flanges 126 include aligned openings sized and configured to permit the passage of a pivot member, for example, a screw or rivet, therethrough. The pole-mounting member 122 also includes one or more flanges 128 having coaxially aligned pivot holes therethrough. In the illustrated embodiment, two flanges 128 are shown. The pole-mounting member 122 also includes opposed coaxially aligned holes 130 for securing the pole-mounting member 122 to a pole, such as a telescopic pole (not shown). The end of a telescoping pole having the smallest outside diameter and a through-hole adjacent the end of the pole is disposed in the bore 132 of the pole-mounting member 122. A fastener, such as a screw or a rivet, is disposed through the holes 130 and the through-hole near the end of the pole to secure the pole to the pole-mounting member 122. The body member 121 includes bosses 136 having internal surfaces that define boss openings external of the ball receiving cavity. It will be appreciated that any suitable technique for securing ends of a retention member within the boss openings including, but not limited to, the techniques illustrated in the various embodiments disclosed herein may be employed.

First and second knobs 124 are provided on opposing sides of the outer flanges 126. In one embodiment, each knob includes a hex-shaped opening 134 extending from an outer end of the knob inward and partially through the knob 124. The hex-shaped opening 134 of the first knob is sized to receive the hex head of a hex head machine screw (not shown) via an interference fit. The first and second knobs 124 also include a generally cylindrical bore aligned with the hex-shaped opening and extending therethrough. The cylindrical bore is sized to permit the threaded end of the machine screw to extend therethrough. As noted above, the hex-shaped opening of the first knob is sized for an interference fit with the hex head of a hex head machine screw upon urging of the head into the opening and is securely retained within the first knob 124 once press fit therein.

The hex-shaped opening of the second knob 124 is sized for an interference fit with a nut having a threaded opening configured to receive the threaded end of the hex head machine screw. The hex-shaped nut is press fit into the hex-shaped opening of the second knob to secure the nut within the opening. The nut may comprise a conventional nut or, alternatively, a nylon insert lock nut ("nylok nut") to reduce the likelihood of undesired loosening of the nut once a desired tension has been set for the hinge formed by the flanges of the body member 121 and the pole-mounting member 122.

The threaded end of the hex head machine screw secured within the first knob 124 extends through the openings in the flanges 126 of the body member 121 and the pivot holes through the flanges 128 of the pole-mounting member 122 and is threaded through the nut secured within the second knob 124. Rotation of the knobs 124 permit the frictional resistance to rotation of the body member 121 with respect to the pole-mounting member 122 to be increased or decreased and is thereby adjustable by a user. Since the body member 121 is pivotally mounted to the pole-mounting member 122, the angle of the body member 121 with respect to the telescoping pole may be adjusted as desired by the user to set an angle that is particularly suited for ball capture. The knobs 124 and mechanism for applying an inward force to the flanges to increase or decrease resistance to rotation of the body member with respect to the pole-mounting member may be employed in any of the previously described embodiments.

In an alternative embodiment, knobs 124 are over-molded over either the head of a bolt, such as a hex head bolt, a cooperative nut, or both to secure the bolt and/or nut within the knob so as to rotate with the respective knob. Other bolt configurations may be employed.

It should be noted that a single knob may be secured to one of the head end of the pivot member (e.g. bolt) or nut and the other one of the head end of the pivot member or nut may be fixed against rotation with respect to the adjacent flange. In this manner a single knob may be employed to provide an adjustment to the rotational resistance between the pole-mounting member and the body member.

The body members of the various illustrated embodiments may include an angled lip that funnels a golf ball toward the center of the golf ball receiving cavity of the body members. Such a structure facilitates use of the golf ball retriever head as a scoop. When used in this manner, the ball receiving opening at the first end of the body member is disposed generally adjacent to a side of the golf ball and the body member is urged against the golf ball in a side-ways or upward direction to avoid the application of downward pressure on the ball which may drive the ball downward into a soft or silty surface as is sometimes found in the bottom of ponds. The ball is typically supported within the opening by inner surfaces of the body member and the retention member as it is being retrieved. In such a use, the ball may not be fully received within the cavity.

When the retriever is used as a scoop to retrieve a ball, it has been observed that it is undesirable for one section of a telescoping pole to rotate with respect to an adjacent section of the telescoping pole since such rotation may allow the weight of the golf ball to rotate adjacent sections of the pole thereby allowing the retriever head to rotate. When using the retriever head as a scoop, the ball may not fully enter the ball receiving cavity. Instead, the ball may simply rest within the opening at the first end of the body member. Rotation of the retriever head due to the weight of the ball may cause the open end of the ball receiving cavity to become downward facing so as to permit the ball to escape from the body member opening if the ball is not fully disposed within the ball receiving cavity. For this reason, it is desirable to employ a telescoping pole in which adjacent sections do not rotate with respect to one another during the ball retrieval process. This may be achieved using a twist lock pole as is conventionally employed in many golf ball retrievers. Such poles use a cam locking mechanism within the pole sections which secures adjacent sections against rotation upon twisting of one section with respect to the adjacent section. Another form of known telescoping pole employs external clamping to lock each section with respect to an adjacent section. A third form of telescoping pole includes a plurality of generally cylindrical tubes that frictionally engage one another or which include spacers or frictional members between the outer diameter of each tube and the inner diameter of an adjacent larger tube to retain the telescoping tube at the desired length once extended by a user. This third form of telescoping pole can result in undesired rotation of adjacent sections due to the weight of the golf ball when the retriever is employed in a scooping manner to retrieve a ball from a soft silty surface as discussed above. For this reason, if a telescoping pole relies on friction for length retention rather than a positive locking mechanism as found with twist lock poles or poles that employ external clamps to positively lock one section with respect to an adjacent section, it is preferable to employ a telescoping pole having non-cylindrical sections to prevent rotation of adjacent pole sections. By way of example such non-rotating telescopic poles are commercially available from Xiamen Dongke Aluminum Co., Ltd. A719 Dongke Factory Buildings, No. 3 Changle Road, Hull District, Xiamen, Fujian, China. By way of example, and not limitation, non-rotating telescopic poles may have non-circular tubing cross-section including but not limited to those illustrated generally in FIGS. 14*a*-14*g*. More specifically, the telescoping pole comprising a plurality of non-circular sections is configured to prevent rotation of each non-circular section with respect to each adjacent non-circular section. One end of the telescoping pole is coupled directly to the body member or is coupled to the body member via a pole-mounting member in the event a pole-mounting member is employed. The telescoping pole has a longitudinal axis and the body member rotates directly about the longitudinal axis with rotation of the telescoping pole about the longitudinal axis. Consequently, the body member will not rotate around the longitudinal axis if the telescoping pole is not rotated by a user. This characteristic makes this configuration particularly suitable when positioning the entry opening of the ball receiving cavity adjacent a golf ball and employing the body member as a scoop to retrieve a ball from a soft or silty surface.

The non-rotating telescoping shaft in which the adjacent sections are non-locking and in which the relative position of adjacent sections are frictionally maintained, as presently described, may be employed with retriever apparatus in which a pole-mounting portion is pivotally connected to a body member portion as described hereinabove. Alternatively, such non-rotating telescoping shafts may be employed with a golf ball retriever in which a pole-mounting portion is integrally formed as a one-piece, unitary and continuous structure with a golf ball retriever head portion configured for golf ball retrieval.

It will be readily appreciated by those of ordinary skill in the art that alterations, modifications and improvements to the above-described golf ball retriever and components thereof may be made without departing from the inventive concepts disclosed herein. Such alterations, modifications and improvements are intended to be part of this disclosure and are within the scope of the invention. The foregoing description and drawings are provided as examples of apparatus in accordance with the invention. Accordingly, the invention should not be viewed as limited except by the scope and spirit of the appended claims.

What is claimed is:

1. Golf ball retriever apparatus for retrieving a golf ball having a weight and a diameter, the apparatus comprising:
   a body member having an outer surface and an inner surface, the inner surface at least partially defining a ball receiving cavity having first and second ends and being sized and configured to accommodate a golf ball therein, the body member having an entry opening to the ball receiving cavity at the first end of the ball receiving cavity and being at least partially occluded at the second end of the cavity, the body member have a lower body member portion and an upper body member portion; and
   a deformable retention member having opposed ends;
   a pair of opposed bosses extending outwardly from the lower body portion of the body member and external to the ball receiving cavity, each boss configured to provide a boss opening within the respective boss that is external to the ball receiving cavity for securing one of the opposed ends of the retention member therein, the retention member extending across the ball receiving cavity with opposed ends being secured within the respective boss openings, wherein the retention member has a first edge facing a distal inner surface of the lower body portion and wherein a distance from the first edge to the distal inner surface of the lower body portion is slightly less than the diameter of the golf ball in the absence of deformation of the retention member a golf ball and the retention member is deformable as the golf ball is urged past the retention member and into the ball receiving cavity, wherein the retention member has a stiffness characteristic specified to generally support the weight of the golf ball once disposed within the cavity, and wherein the body member and the opposed bosses are an integral, continuous, one piece, unitary member.

2. The golf ball retriever apparatus of claim 1 wherein the body member includes a top outer surface, the apparatus further including at least one body member flange having a pivot opening therethrough, the pivot opening sized to accommodate a pivot member, the at least one body member flange extending from the top outer surface.

3. The golf ball retriever apparatus of claim 2 wherein the at least one body member flange comprises at least two spaced and generally parallel body member flanges having coaxially aligned pivot openings.

4. The golf ball retriever apparatus of claim 3 further including the pivot member, wherein the at least two body member flanges comprise two body member flanges and the apparatus includes a telescoping pole having a pivot hole extending through one end thereof, the telescoping pole disposed between the two body member flanges with the pivot hole of the telescoping pole coaxially aligned with the pivot openings of the two body member flanges, and wherein the pivot member extends through the pivot openings of the two body member flanges and the pivot hole of the telescoping pole to provide for pivotal rotation of the body member with respect to the telescoping pole.

5. The golf ball retriever apparatus of claim 2 wherein the at least one body member flange comprises three spaced generally parallel body member flanges.

6. The golf ball retriever apparatus of claim 5 further including:
   a pole-mounting member having a first end configured for mounting a telescoping pole thereto, the pole-mounting member including at least two spaced generally parallel pole-mounting member flanges having coaxially aligned pivot openings therethrough, each of the pole-mounting member flanges being disposed between two of the body member flanges; and
   a pivot member extending through the coaxially aligned pivot openings of the body member flanges and the pole-mounting member flanges to pivotally mount the pole-mounting member to the body member.

7. The golf ball retriever apparatus of claim 6 further including a telescoping pole having first and second ends, the first end being mounted to the pole-mounting member.

8. The golf ball retriever apparatus of claim 2 further including:
   a pole-mounting member having at least one pole-mounting member flange extending from one end thereof, each pole-mounting member flange having a pivot opening therethrough;
   a pivot member having first and second ends and a length, the pivot member extending through each pivot opening of the at least one body member flange and the at least one pole-mounting member flange to permit pivotal rotation of the body member with respect to the pole-mounting member, wherein at least a portion of the length of the pivot member extending from the second end of the pivot member is threaded;
   a nut sized and configured for threaded engagement with the second end of the pivot member; and
   first and second knob-like members, the first knob-like member being securely coupled to the first end of the pivot member to provide direct rotation of the pivot member with rotation of the first knob-like member, and the second knob-like member being securely coupled to the nut to provide direct rotation of the nut with rotation of the second knob-like member, the knob-like members being located outwardly of the body member and pole-mounting member flanges,
   wherein the second end of the pivot member is in threaded engagement with the nut to permit a resistance to rotation of the pole-mounting member with respect to the body member to be adjusted by a user upon rotation of the first and second knob-like members with respect to each other.

9. The golf ball retriever apparatus of claim 1 wherein the body member includes a pole-mounting portion that is formed with the body member as an integral, continuous, one piece unitary member, the pole-mounting portion being configured for mounting a telescoping pole thereto, and
   a telescoping pole mounted to the pole-mounting portion of the body member.

10. The golf ball retriever apparatus of claim 1 wherein the retention member is a generally straight beam-like member when not subject to deformation produced by the golf ball.

11. The golf ball retriever apparatus of claim 1 wherein the retention member is a curved beam-like member that curves inwardly toward a center of the ball receiving cavity in the absence of deformation of the retention member.

12. The golf ball retriever apparatus of claim 1 wherein the retention member is a spring having first and second ends.

13. The golf ball retriever apparatus of claim 12 further including first and second screws, the first and second screws securing the first and second ends of the spring within opposed boss openings.

14. The golf ball retriever apparatus of claim 1 wherein the retention member is a spring having opposed ends, the apparatus further including a spring retaining member formed within the boss opening of each of the opposed bosses, each spring retaining member being formed as an integral, continuous, one piece unitary member with a respective boss and configured for securing one of the opposed ends of the spring within the boss opening via mechanical engagement of the respective spring end with the spring retaining member.

15. The golf ball retriever apparatus of claim 1 further including a lip angled outward from the first end of the body member and away from the body member, the lip having an inward facing surface configured to urge a golf ball coming in contact with the inward facing surface toward a center of the body member entry opening.

16. The golf ball retriever apparatus of claim 1 further including:
   a telescoping pole having a longitudinal axis and having an end coupled to the body member, the telescoping pole comprising of a plurality of cooperative telescoping non-circular sections configured to permit extension and retraction of the shaft while generally preventing rotation of adjacent non-circular sections with respect to one another, wherein the body member rotates directly about the longitudinal axis with rotation of the telescoping pole about the longitudinal axis.

17. The golf ball retriever apparatus of claim 16 further including a pole-mounting member distinct from the body member, wherein the body member is configured for pivotal mounting to the pole-mounting member and the body member is pivotally mounted to the pole-mounting member to permit pivotal rotation of the body member with respect to the pole-mounting member, wherein the telescoping pole is coupled to the body member via mounting of the telescoping pole to the pole-mounting member.

\* \* \* \* \*